US008661288B2

(12) United States Patent
Fuchs et al.

(10) Patent No.: US 8,661,288 B2
(45) Date of Patent: Feb. 25, 2014

(54) DIAGNOSIS SYSTEM FOR REMOVABLE MEDIA DRIVE

(75) Inventors: Gerrit Fuchs, Villlingen-Schwennigen (DE); Krasnodar Jandrijevic, Tuttlingen (DE); Juan Medrano, Röttenbach (DE)

(73) Assignee: Harman Becker Automotive Systems GmbH, Karlsbad (DE)

( * ) Notice: Subject to any disclaimer, the term of this patent is extended or adjusted under 35 U.S.C. 154(b) by 125 days.

(21) Appl. No.: 13/204,431

(22) Filed: Aug. 5, 2011

(65) Prior Publication Data

US 2012/0072778 A1   Mar. 22, 2012

(30) Foreign Application Priority Data

Aug. 12, 2010   (EP) ................................. 10008435

(51) Int. Cl.
*G06F 11/00*   (2006.01)
(52) U.S. Cl.
USPC ............................................. 714/6.1; 714/42
(58) Field of Classification Search
USPC ........................................................ 714/6.1
See application file for complete search history.

(56) References Cited

U.S. PATENT DOCUMENTS

| | | | |
|---|---|---|---|
| 6,467,054 B1 | 10/2002 | Lenny | |
| 7,136,768 B1* | 11/2006 | Shah et al. ................... | 702/115 |
| 7,293,203 B1* | 11/2007 | Coatney et al. ................. | 714/42 |
| 7,308,609 B2* | 12/2007 | Dickenson et al. ............ | 714/36 |
| 7,971,101 B2* | 6/2011 | Black et al. .................... | 714/42 |
| 2002/0181356 A1* | 12/2002 | Watanabe et al. .......... | 369/47.16 |
| 2003/0061546 A1* | 3/2003 | Collins et al. .................. | 714/42 |
| 2003/0147169 A1* | 8/2003 | Smith ........................ | 360/73.01 |
| 2004/0078668 A1 | 4/2004 | Kamon et al. | |
| 2006/0265545 A1* | 11/2006 | Entani .......................... | 711/103 |
| 2007/0180330 A1* | 8/2007 | Black et al. .................... | 714/42 |
| 2007/0245084 A1* | 10/2007 | Yagisawa et al. ............. | 711/114 |
| 2008/0010557 A1 | 1/2008 | Kume | |
| 2010/0067343 A1* | 3/2010 | Kaneko ...................... | 369/53.44 |

FOREIGN PATENT DOCUMENTS

| | | |
|---|---|---|
| EP | 0281408 A2 | 9/1988 |
| JP | 2006018955 A | 1/2006 |
| JP | 2007294000 A | 11/2007 |

* cited by examiner

*Primary Examiner* — Kamini Patel
(74) *Attorney, Agent, or Firm* — O'Shea Getz P.C.

(57) ABSTRACT

Systems and methods are provided for performing diagnostics on a removable media drive. An example system includes a monitoring unit configured to collect information about a media access to the media drive and a media access to a removable media contained in the media drive. The example system also includes a storage unit having a threshold table with at least one threshold value for the media access to the media drive. A processing unit is configured to compare the collected information of the monitoring unit to the at least one threshold value contained in the threshold table. The processing unit is also configured to determine diagnostic data relating to the removable media drive in accordance with the comparison.

18 Claims, 6 Drawing Sheets

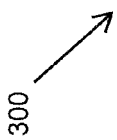

| ATTRIBUTE NAME | SESSION(*) | MODE (**) | DESCRIPTION |
|---|---|---|---|
| START_STOP_COUNT_CD | DRIVE | ONLINE | SPINDLE MOTOR AND LASER DIODE ACTIVITY VALUE |
| START_STOP_COUNT_DVD | DRIVE | ONLINE | SPINDLE MOTOR AND LASER DIODE ACTIVITY VALUE |
| POWER_ON_HOURS_CD | DRIVE | ONLINE | ATAPI DRIVER LOAD VALUE COULD BE USED TO DETECT THE DRIVE POWER ON VALUE |
| POWER_ON_HOURS_DVD | DRIVE | ONLINE | ATAPI DRIVER LOAD VALUE COULD BE USED TO DETECT THE DRIVE POWER ON VALUE |
| DISC_INSERTION_TIME | DRIVE/MEDIA | ONLINE | TIME UNTIL THE DISC DETECTION |
| LOAD_CYCLE_COUNT | DRIVE | ONLINE | EJECT IS NOT COUNTED. MECHANICAL WEAR. |
| MEDIA_DETECTION_ERROR | DRIVE | ONLINE | NOT POSSIBLE FOR MEDIA SESSION, SINCE NOT DETECTED |
| MECHANICAL_ERROR | DRIVE | ONLINE | |
| HW_DRIVE_RESET_COUNT | DRIVE | ONLINE | DETECTION AFTER RESTART POSSIBLE |
| SW_DRIVE_RESET_COUNT | DRIVE/MEDIA | ONLINE | DETECTION AFTER RESTART POSSIBLE |
| DRIVE_TEMPERATURE | DRIVE | ONLINE | |
| READ_ERROR_COUNT | DRIVE/MEDIA | ONLINE | |
| MEDIA_INIT_ERROR | DRIVE/MEDIA | ONLINE | MOUNT WAS NOT SUCCESSFUL. |
| SLOT_CHANGE_COUNT | DRIVE | ONLINE | |
| DRIVE_UPDATE_COUNT | DRIVE | ONLINE | FIRMWARE UPDATE |
| DOUBLE_DISC_INSERTION | DRIVE | ONLINE | |
| HI_SPEEDMODE_COUNT | DRIVE | ONLINE | FOR NAVI UPDATE (HDD) |
| SPEEDMODE_COUNT | DRIVE | ONLINE | NO OF CHANGES BETWEEN CLV, CAV, ZCAV,... |

FIG. 3

| ATTRIBUTE NAME | SESSION (*) | MODE (**) | DESCRIPTION |
|---|---|---|---|
| DISC_INSERTION_TIME | MEDIA | ONLINE | TIME UNTIL THE DISC DETECTION |
| HW_DRIVE_RESET_COUNT | MEDIA | ONLINE | |
| SW_DRIVE_RESET_COUNT | MEDIA | ONLINE | |
| READ_ERROR_COUNT | MEDIA | ONLINE | |
| MEDIA_INIT_ERROR | MEDIA | ONLINE | MOUNT WAS NOT SUCCESSFUL. |

| ATTRIBUTE NAME | SESSION (*) | MODE (**) | DESCRIPTION |
|---|---|---|---|
| MEDIA TYPE | MEDIA | ONLINE | GOT FROM DRIVE HANDLER OR VIA ATAPI COMMAND |
| DISC SERIAL NO | MEDIA | ONLINE | GOT FROM DRIVE HANDLER OR VIA ATAPI COMMAND |
| SEEK_TIME_PERFORMANCE | MEDIA | OFFLINE | VENDOR COMMAND OR MAX VALUE |
| TEST_JITTER | MEDIA | OFFLINE | VENDOR COMMAND |
| SLOT_ACCESS_TIME | MEDIA | OFFLINE | VENDOR COMMAND |

FIG. 4

| ATTRIBUTE NAME | SESSION(*) | MODE(**) | THRES |
|---|---|---|---|
| START_STOP_COUNT_CD | DRIVE | ONLINE | TBD |
| START_STOP_COUNT_DVD | DRIVE | ONLINE | TBD |
| POWER_ON_HOURS_CD | DRIVE | ONLINE | TBD |
| POWER_ON_HOURS_DVD | DRIVE | ONLINE | TBD |
| DISC_INSERTION_TIME | DRIVE | ONLINE | TBD |
| LOAD_CYCLE_COUNT | DRIVE | ONLINE | TBD |
| MEDIA_DETECTION_ERROR | DRIVE | ONLINE | TBD |
| MECHANICAL_ERROR | DRIVE | ONLINE | TBD |
| HW_DRIVE_RESET_COUNT | DRIVE | ONLINE | TBD |
| SW_DRIVE_RESET_COUNT | DRIVE | ONLINE | TBD |
| DRIVE_TEMPERATURE | DRIVE | ONLINE | TBD |
| READ_ERROR_COUNT | DRIVE | ONLINE | TBD |
| MEDIA_INIT_ERROR | DRIVE | ONLINE | TBD |
| SLOT_CHANGE_COUNT | DRIVE | ONLINE | TBD |
| DRIVE_UPDATE_COUNT | DRIVE | ONLINE | TBD |
| DOUBLE_DISC_INSERTION | DRIVE | ONLINE | TBD |
| HI_SPEEDMODE_COUNT | DRIVE | ONLINE | TBD |
| SPEEDMODE_COUNT | DRIVE | ONLINE | TBD |
| SEEK_TIME_PERFORMANCE | REF-DISC | OFFLINE | TBD |
| TEST_JITTER | REF-DISC | OFFLINE | TBD |
| SLOT_ACCESS_TIME | REF-DISC | OFFLINE | TBD |

DIAGNOSIS SYSTEM FOR REMOVABLE MEDIA DRIVE

RELATED APPLICATIONS

This application claims priority of European Patent Application Serial No. 10 008 435.9, filed on Aug. 12, 2010, titled DIAGNOSIS SYSTEM FOR REMOVABLE MEDIA DRIVE, which application is incorporated in its entirety by reference in this application.

BACKGROUND OF THE INVENTION

1. Field of the Invention

This invention relates to a diagnostic system for a removable media drive and, more particularly, to systems and methods for generating diagnostic information for the removable media drive.

2. Related Art

Computer disks and disk drives are typically expected to remain available and operational for significant lengths of time. Since disk drives may have moving parts and other mechanical, electrical and optical components that are subject to fail over time, it is desirable to monitor and track their use and operability. An industry standard technology called SMART (Self Monitoring Analysis and Reporting Technology) has been established in order to estimate the remaining lifetime of a hard disk. However, the SMART technology has been applied to hard disk drives, or non-removable, magnetic drives that typically provide computers with an operating system. Optical drives, which have electronic, mechanical, and other key components, such as the laser diode and the inserted media, that may be subject to failure over time, have not been monitored or tracked. As such, the lifetime of optical drives is unknown. Without any historical data, it is not possible to estimate the drive wear and remaining lifetime for the drive of a removable media.

Accordingly, a need exists to obtain reliable information about the drive wear and the remaining lifetime of the media drive.

SUMMARY

In view of the above, a system is provided for performing diagnostics on a removable media drive. An example system includes a monitoring unit configured to collect information about a media access to the media drive and a media access to a removable media contained in the media drive. The example system also includes a storage unit having a threshold table with at least one threshold value for the media access to the media drive. A processing unit is configured to compare the collected information of the monitoring unit to the at least one threshold value contained in the threshold table. The processing unit is also configured to determine diagnostic data relating to the removable media drive in accordance with the comparison.

Other devices, apparatus, systems, methods, features and advantages of the invention will be or will become apparent to one with skill in the art upon examination of the following figures and detailed description. It is intended that all such additional systems, methods, features and advantages be included within this description, be within the scope of the invention, and be protected by the accompanying claims.

BRIEF DESCRIPTION OF THE FIGURES

The examples of the invention described below may be better understood by referring to the following figures. The components in the figures are not necessarily to scale, emphasis instead being placed upon illustrating the principles of the invention. In the figures, like reference numerals designate corresponding parts throughout the different views.

FIG. 3 is a diagram illustrating an example of a media session table or a drive session table.

FIG. 4 is a diagram illustrating examples of media drive tables.

FIG. 5 is a diagram illustrating an example of a drive threshold table.

DETAILED DESCRIPTION

Figure 1:
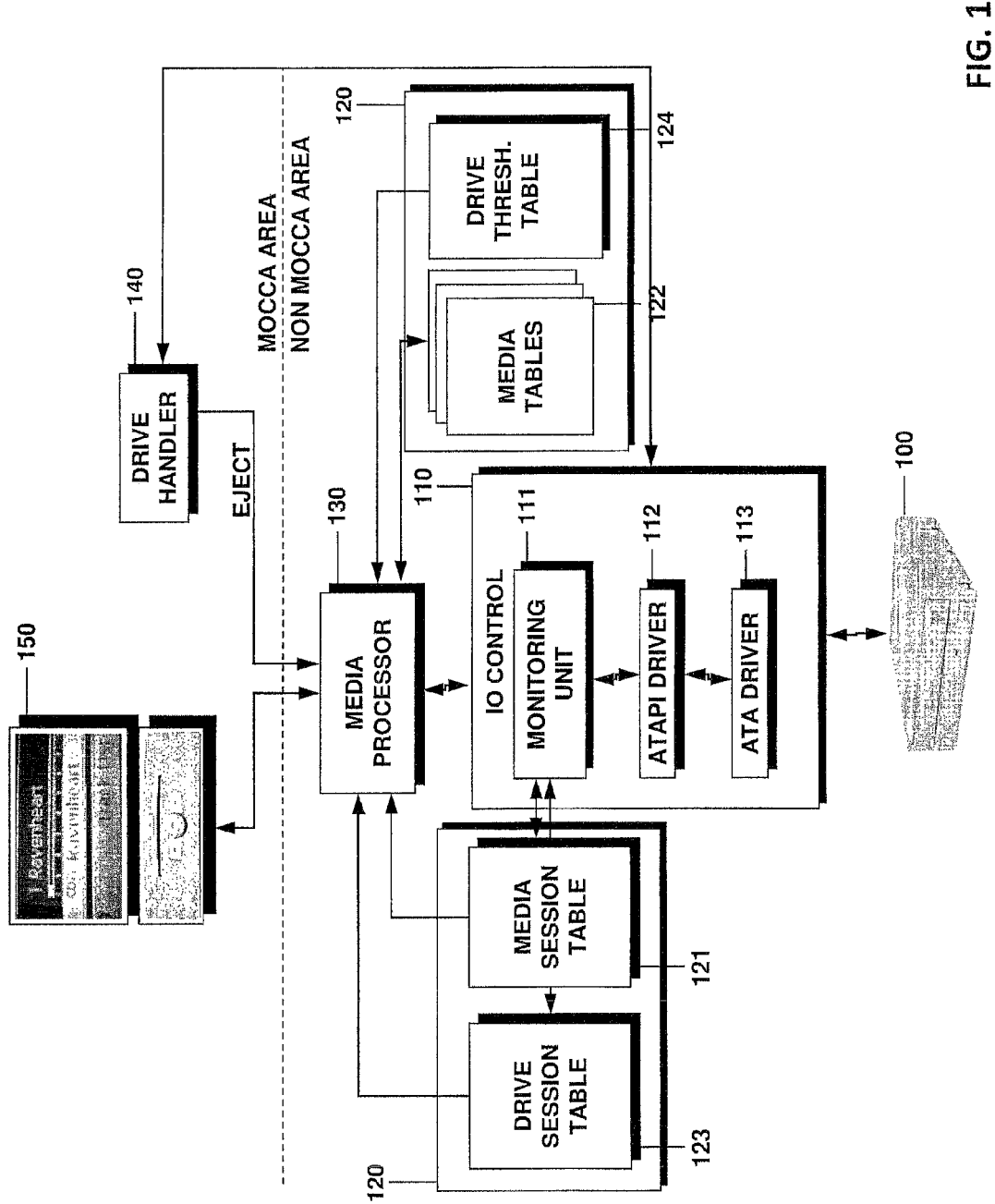
FIG. 1 is a schematic diagram of an example system for obtaining diagnostic information of a removable media drive.

FIG. 1 is a schematic diagram of an example system for obtaining diagnostic information of a removable media drive 100. The system shown in FIG. 1 may be implemented for operation in any hardware unit where the removable media drive 100, such as a CD drive or a DVD drive, is installed. As shown in FIG. 1, the removable media drive 100 connects via an input/output control unit 110, which includes a monitoring unit 111 configured to collect data or information about a media access to the media drive, or a media access to the removable media contained in the removable media drive 100. A media access may include any operation involving the input or output of data to or from the removable media drive 100. The removable media drive 100 includes electronic components, mechanical components, and optical components, such as a laser diode to read the inserted media, which may include a CD or a DVD.

The monitoring unit 111 records, or logs, all media accesses to and from the media and the removable media drive 100. The monitoring unit 111 is shown as a separate functional unit. However, it should be understood that the monitoring unit 111 may be incorporated into other components. For example, the monitoring unit 111 may be incorporated in a standard media interface driver, which may include an AT Attachment Packet Interface ("ATAPI") driver 112 or an AT Attachment ("ATA") driver 113. The ATAPI driver 112 and ATA driver 113 provide an interface for communication to the hardware, or the removable media drive 100. It is noted that the ATAPI and ATA interfaces are standard interfaces known to those of ordinary skill in the art and therefore require no further description. In addition, it is noted that ATAPI, ATA and any other standard is referenced as examples for implementation and not intended as limiting. The monitoring unit 111 may be incorporated as hardware components, software components or as a combination of hardware and software components. In an example, the monitoring unit 111 may be implemented as an extension of the protocol of the media low level driver interface block (for example, ATAPI, USB, File I/O) with lifetime and history counters for all wearing parts of the media or drive. The monitoring unit 111 may also link the counters to the serial number of the inserted media or of the media drive.

The system shown in FIG. 1 may also include a storage unit 120 that stores different tables that may be used by a processing unit 130 to calculate the drive wear and the remaining lifetime of the media drive 100. The monitoring unit 111 may separately collect information for every media session and every media drive session. A media session is understood, for purposes of clarity in the description of the examples described below, to begin with the loading of the media into the media drive 100, and to end after the media is ejected from the media drive 100. Each media session may be associated with an identifier, such as for example, a serial number of the media drive 100 or any other suitable identifier. A drive session may be associated with a drive serial number, which is renewed after a drive exchange. The monitoring unit 111 collects information about a media access to the media and to the media drive, and stores the information in tables provided in the storage unit 120. For each inserted media, the information about the corresponding media session is collected in a media session table 121.

Figure 6:
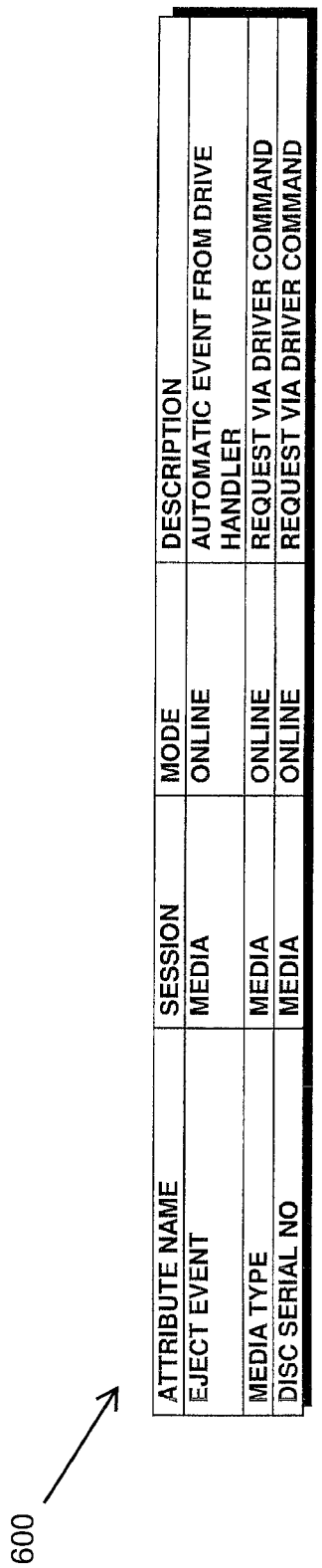
FIG. 6 is a diagram illustrating an example of a table for organizing driver handler information.

FIG. 1 shows a broken line defining a border between a mocca area and a non-mocca area, which are areas defined to delimit the drive plane from the user plane. In the user plane, the system in FIG. 1 includes a drive handler 140 and a user interface 150. The drive handler 140 informs the processing unit 130 of events relating to the media drive 100. For example, the drive handler 140 may inform the processing unit 130 that a disk is being inserted or ejected from the media drive 100. FIG. 6 illustrates an example of a table that may be used to maintain information provided by the drive handler 140. The user interface 150 may be used to provide information, including information from the table 600 shown in FIG. 6, to the user as shown in FIG. 1. The user interface 150 may be configured to show the information in a variety of ways that may correspond to the function and context in which the information is being displayed.

FIG. 3 is a diagram illustrating an example of a media session table 300 or a drive session table 300. The media session table 300 may be located in a persistent memory area of the system, such as non-volatile RAM, for example. The size and the information structure of the media session table 300 are fixed in an example implementation, which illustrates information as having an attribute name, a session type, a mode, and a description. The monitoring unit 111 stores each raw value of each attribute once per session. As shown in FIG. 3, the monitoring unit 111 counts the number of starts and stops of the laser diode for a CD ("START STOP_ COUNT_CD"), the number of starts and stops of the laser diode for a DVD ("START_STOP_COUNT_DVD"), the number of power-on hours ("POWER_ON_HOURS_CD"), the number of load cycles ("LOAD_CYCLE_COUNT"), etc. as shown in FIG. 3. Other parameters that may be supervised include, by way of example as shown in FIG. 3, the number of mechanical errors ("MECHANICAL_ERROR"), hardware or software drive reset counts ("HW_DRIVE_RESET_COUNT," "SW_DRIVE_RESET_COUNT"), or the drive temperature ("DRIVE_TEMPERATURE"). When an ejection of the media is detected, the acquired data that has been maintained in the media session table 300 during the media session are transferred to a media drive table 122 corresponding to the media session. The media session table 300 will then be cleared when a new media (such as a different CD or DVD, for example) is inserted into the media drive 100 to start a second media session. The media session table 300 may then be filled with data corresponding to the newly inserted media corresponding to the second media session. When this new media is ejected and the second media session is ended, a new media drive table 122 corresponding to the second media session is generated. In this way, a media drive table is generated for each media session resulting in a collection of a plurality of media tables as illustrated by the multiple media drive tables 122 shown in FIG. 1.

The data collected in the media session table 300 in FIG. 3 are also transferred to the drive session table 123, which stores the data that is collected over the lifetime of the media drive 100 until replaced by another drive 100. The drive session table maintains the data corresponding to the media session table 300 as data that is accumulated over the lifetime of the media drive 100 in order to determine information relating to the overall wear of the media drive 100, such as for example, the number of power-on hours, the number of drive resets, etc. The table shown in FIG. 3 may therefore be generated for each media session and for each drive session.

FIG. 4 is a diagram illustrating examples of media drive tables. In FIG. 4, a first media drive table 400 includes data copied from the media session table. The data copied from the media session table may be copied in any suitable order, and may include the type of information maintained in the media session table 300 in FIG. 3 including for example, the attribute name, session, mode, and description. The data shown in a second, or second part 402 of the media drive table in FIG. 4 are data relating to the media drive table obtained by special ATAPI commands.

The system in FIG. 1 may further include a drive threshold table 124. FIG. 5 is a diagram illustrating an example of a drive threshold table 500. The drive threshold table 500 may be formatted to store the lifetime limit raw values that will be used by the processing unit 130 for a comparison with the information provided by the drive session table 123. The drive threshold table 500 may include data elements corresponding to the data stored in the media drive table 400 in FIG. 4 as indicated by the matching attribute names in the corresponding tables. The drive threshold table 500 may also maintain a session identifier, a mode, and a threshold value for each attribute name listed in the drive threshold table 500. The processing unit 130 may also use the different media drive tables 400 (in FIG. 4) in order to determine whether, in case an inserted media cannot be read, the error may be due to the inserted media itself, or due to the age, as an indicator of wear and tear, of the media drive 100. By comparing the information provided in the drive session table with the corresponding information in the media drive tables, it may also be possible to distinguish errors of a single unreadable medium from drive lifetime parameters.

The processing unit 130 in FIG. 1 transfers data provided in the media session table to a media drive table for a current media session when an eject event is detected. The processing unit 130 also compares the lifetime data stored in the drive session table with the threshold values stored in the drive threshold table.

The monitoring unit 111 may be configured to monitor all media accesses to the media and the media drive 100. The monitoring unit 111 may write the values stored in the media session table shown in FIG. 3 into the corresponding values in the drive session table, which may be formatted the same as the media session table as shown in FIG. 3, and into corresponding values in the media drive tables shown in FIG. 4. The tables maintained during media sessions and drive sessions are valid until the media or the media drive 100 is changed. In addition, in the event of a media change or media drive 100 exchange, the data stored in the media session table are copied into persistent memory. The monitoring unit 111 may also retrieve the values from the drive session table or media drive tables to determine information relating to the drive fitness.

Figure 2:
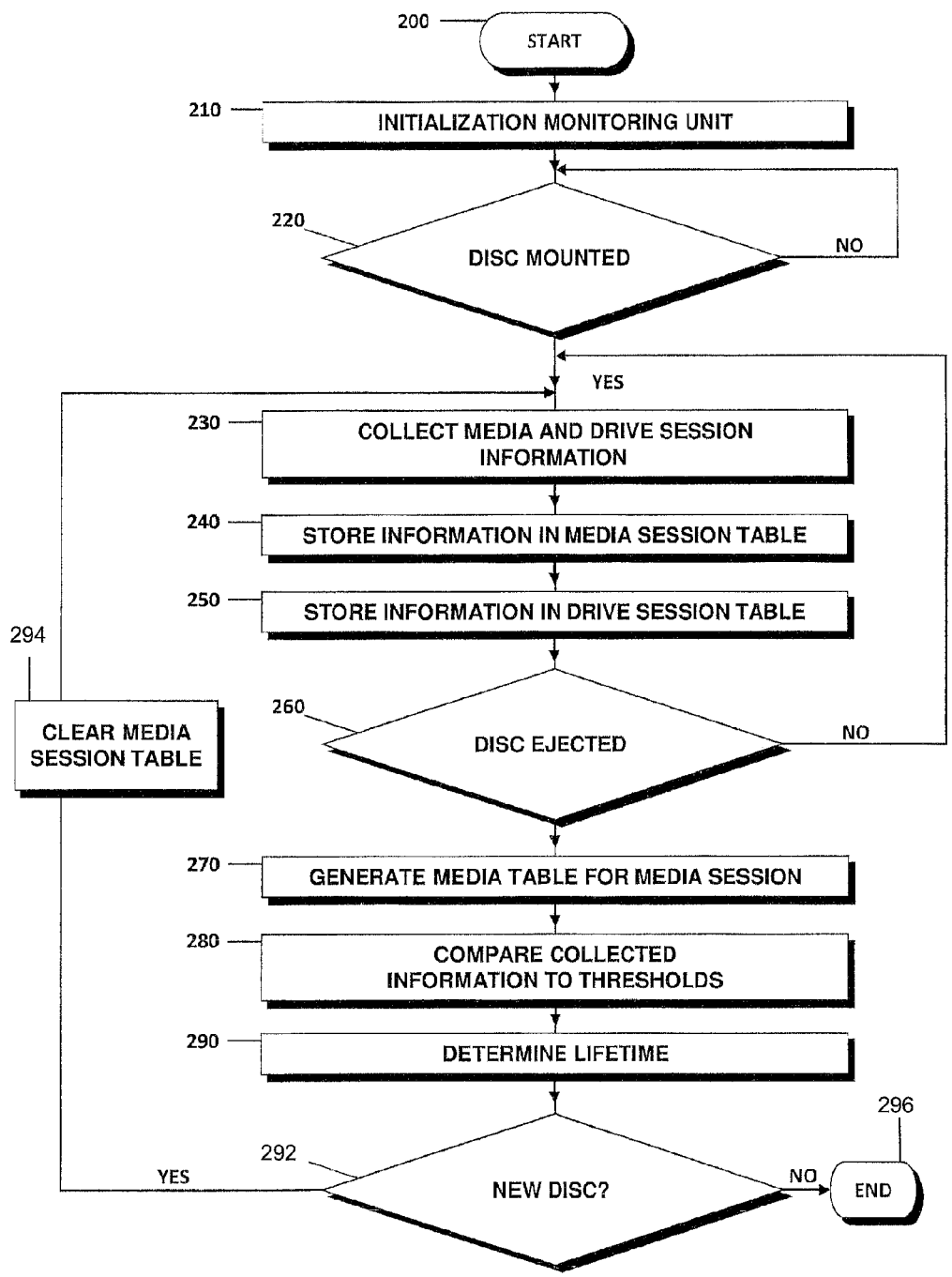
FIG. 2 is a flowchart illustrating operation of an example method for determining the remaining lifetime of the media drive.

FIG. 2 is a flowchart illustrating operation of an example method for determining the remaining lifetime of the media drive. The method illustrated in FIG. 2 is described as follows with reference to steps performed by the system shown in FIG. 1.

Referring to FIG. 2, after a start in step 200, the monitoring unit 111 performs an initialization step as step 210. In the initialization step, the monitoring unit 111 may update the media session table 121 and the drive session table in accordance with a media access detected for the media drive 100. In decision block 220, the media drive 100 is checked to deteiinine if a disk has been inserted into the media drive 100. If a disk/media is detected in the media drive 100, the information of the media session is collected in step 230 and stored in the media session table in step 240. The information may also be stored in the drive session table in step 250 to update the information about media access to the media and media drive that is being collected over the lifetime of the media drive 100. In decision block 260, the media drive 100 is checked to determine if a disk has been ejected from the media drive 100, thus ending the current media session. As long as the media is inside the media drive 100, the information is collected and stored in the corresponding tables as described with reference to steps 230, 240, and 250. If the media session has ended with a disk ejection, a media drive table for the media session is generated in step 270. In step 280, the information in the drive session table and media drive tables are compared to the drive threshold table to determine information relating to the drive fitness. The remaining lifetime of the media drive 100 may also be determined as indicated in step 290. The media processor 130 may determine the remaining lifetime of the media drive 100 by comparing the data from the drive session table with the threshold values contained in the threshold table. For example, media processor 130 may compare parameters in the corresponding tables that may include the power-on hours counted for a DVD or a CD, the number of mechanical errors, and the number of read errors. The values for these parameters (or attributes) stored in the drive session table may then be compared with corresponding threshold values in the drive threshold tables. The results may be used in a variety of ways. For example, heuristics may be applied for deducing information about the drive fitness from the results of the comparisons. If many values in the drive session table reach the thresholds, it may be deduced that the remaining lifetime is becoming shorter. The media processor 130 may also deduce information about the remaining lifetime of the media drive 100 by tracking the values of selected parameters in the different media tables over time. For example, if the number of read hours drastically increases over time, the media processor 130 may have additional logic to identify this evolution as a pattern that may indicate an approximate remaining lifetime. The evolution may be compared with predefined data sets where different sets of evolutions of parameters in the different media tables correspond to different approximations of the remaining lifetime specified in operating hours. As a further example, the information in the different media session tables may indicate by deduction that the reading errors for different media have increased over a predefined number of sessions by more than 10%. It may be further deduced that the remaining lifetime may be, for example, 100 hours whereas, for another situation in which the error rate has increased by 30% over a predefined number of different media sessions, the remaining lifetime correspond to only 30 hours.

The media processor 130 may determine information relating to the remaining lifetime of the media drive 100 and provide estimates in terms of hours, days, or weeks based on access to two types of information. First, the media processor 130 may use the results of the comparison of the data from the drive session table with the threshold values. In addition, the media processor 130 may determine information based on the evolution of the readability of the removable media based on information from the different media tables described above.

In decision block 292, the media drive 100 may be checked to determine if a new disk has been inserted in the media drive 100. If a new disk has been detected, the media session table is cleared in step 294 to allow for the collection of new data for the new a media session. If no new disk is detected, the method ends in step 296.

The method illustrated with reference to the flowchart in FIG. 2 may be used during the lifetime of the media drive 100. If the media drive 100 is replaced by a new media drive, or if a new media drive is installed in the system, the new media drive may be detected. The detection of the new media drive may result in the clearing of the drive session table 123 for initiation of a new drive session.

It will be understood, and is appreciated by persons skilled in the art, that one or more processes, sub-processes, or process steps described in connection with FIGS. 1-6 may be performed by hardware and/or software. If the process is performed by software, the software may reside in software memory (not shown) in a suitable electronic processing component or system such as, one or more of the functional components or modules schematically depicted in FIGS. 1-6. The software in software memory may include an ordered listing of executable instructions for implementing logical functions (that is, "logic" that may be implemented either in digital form such as digital circuitry or source code or in analog form such as analog circuitry or an analog source such an analog electrical, sound or video signal), and may selectively be embodied in any computer-readable medium for use by or in connection with an instruction execution system, apparatus, or device, such as a computer-based system, processor-containing system, or other system that may selectively fetch the instructions from the instruction execution system, apparatus, or device and execute the instructions. In the context of this disclosure, a "computer-readable medium" is any means that may contain, store or communicate the program for use by or in connection with the instruction execution system, apparatus, or device. The computer readable medium may selectively be, for example, but is not limited to, an electronic, magnetic, optical, electromagnetic, infrared, or semiconductor system, apparatus or device. More specific examples, but nonetheless a non-exhaustive list, of computer-readable media would include the following: a portable computer diskette (magnetic), a RAM (electronic), a read-only memory "ROM" (electronic), an erasable programmable read-only memory (EPROM or Flash memory) (electronic) and a portable compact disk read-only memory "CDROM" (optical). Note that the computer-readable medium may even be paper or another suitable medium upon which the program is printed, as the program can be electronically captured, via for instance optical scanning of the paper or other medium, then compiled, interpreted or otherwise processed in a suitable manner if necessary, and then stored in a computer memory.

The foregoing description of implementations has been presented for purposes of illustration and description. It is not exhaustive and does not limit the claimed inventions to the precise form disclosed. Modifications and variations are possible in light of the above description or may be acquired from practicing the invention. The claims and their equivalents define the scope of the invention.

What is claimed is:

1. A system for performing diagnostics on a removable media drive, the system comprising:
   a monitoring unit configured to collect information about a media access to the media drive and a media access to a removable media contained in the media drive;
   a storage unit having a threshold table with at least one threshold value for the media access to the media drive; and
   a processing unit configured to compare the collected information of the monitoring unit to the at least one threshold value contained in the threshold table and configured to determine diagnostic data relating to the removable media drive in accordance with the comparison,
   where the monitoring unit is configured to collect media session information in a media drive table where a media session begins with an insertion of the removable media into the media drive and concludes when the removable media is ejected from the media drive, and is configured to collect drive session information in a drive session table stored separately from the media session information, the drive session information being collected until the removable media drive is exchanged, and
   where the processing unit determines the remaining lifetime by comparing data from the drive session table to the threshold values contained in the threshold table, and using a determination of an evolution of the readability of the removable media in the media drive based on the information stored in the different media tables.

2. The system of claim 1 where the monitoring unit is configured to generate a media drive table for each removable media inserted into the media drive.

3. The system of claim 1 where the monitoring unit is configured to collect a media serial number and to store the media serial number together with the media drive table of the media session.

4. The system of claims 1 where the monitoring unit is configured to first collect the media session information in a media session table, the processing unit being configured to transfer the data contained in the media session table to the media drive table of the media session when the removable media is ejected from the media drive, and to clear the media session table by when a new media is inserted into the removable media drive.

5. The system of claim 1 where the processing unit is configured to determine a remaining lifetime of the removable media drive in accordance with the comparison.

6. The system of claim 1 where the processing unit is configured to generate the media drive tables for each removable media session in a persistent area of the storage unit.

7. The system of claim 1 further comprising a drive handler configured to detect an eject event of the removable media and transmitting the eject event to the processing unit.

8. A method for generating diagnostic information for a removable media drive, the method comprising:
   collecting information about a media access to the media drive and a media access to a removable media contained in the media drive;
   providing a threshold table with at least one threshold value for the media access to the media drive;
   comparing the collected information about the media access to the media drive and the media access to the removable media contained in the media drive to the at least one threshold value contained in the threshold table and determining diagnostic data relating to the removable media drive in accordance with the comparison a diagnostic information for the removable media drive in accordance with the comparison;
   collecting media session information relating to a media session in a media drive table, where the media session begins with an insertion of the removable media into the media drive and concludes when the removable media is ejected from the media drive; and collecting drive session information in a drive session table separately from the media session information, the step of collecting being performed until the removable media drive is exchanged.

9. The method of claim 8 further comprising:
generating a media drive table for each removable media inserted into the media drive.

10. The method of claim 8 further comprising:
collecting the media session information in a media session table;
transferring the data contained in the media session table to the media drive table of the media session when the removable media is ejected from the media drive; and
clearing the media session table when it is detected that a new media is inserted into the removable media drive.

11. The method of claim 8 further comprising:
determining the diagnostic information by comparing data from the different media tables and the drive session table to the threshold values contained in the threshold table.

12. The method of claim 8 further comprising:
determining the remaining lifetime of the removable media drive; and
including the remaining lifetime of the removable media drive as the diagnostic information.

13. The method of claim 8 where the step of collecting information includes the step of:
counting the number of starts or stops of a media reader used in the media drive for reading the removable media.

14. The method of claim 8 where the step of collecting information includes the step of:
counting the number of working hours.

15. The method of claim 8 where the step of collecting information includes the step of:
determining the number of drive resets.

16. The method of claim 8 where the step of collecting information includes the step of:
determining the number of read errors.

17. The method of claim 8 where the step of collecting information includes the step of:
determining the drive temperature.

18. The method of claim 8 where the step of collecting information includes the step of:
determining the number of media insertions in the removable media drive.

* * * * *

UNITED STATES PATENT AND TRADEMARK OFFICE
CERTIFICATE OF CORRECTION

| | | |
|---|---|---|
| PATENT NO. | : 8,661,288 B2 | Page 1 of 1 |
| APPLICATION NO. | : 13/204431 | |
| DATED | : February 25, 2014 | |
| INVENTOR(S) | : Gerrit Fuchs et al. | |

It is certified that error appears in the above-identified patent and that said Letters Patent is hereby corrected as shown below:

In the Specification

Column 5
Lines 5-6, please delete "deteii-nine" and insert -- determine --

Signed and Sealed this
Twentieth Day of May, 2014

Michelle K. Lee
*Deputy Director of the United States Patent and Trademark Office*